UNITED STATES PATENT OFFICE.

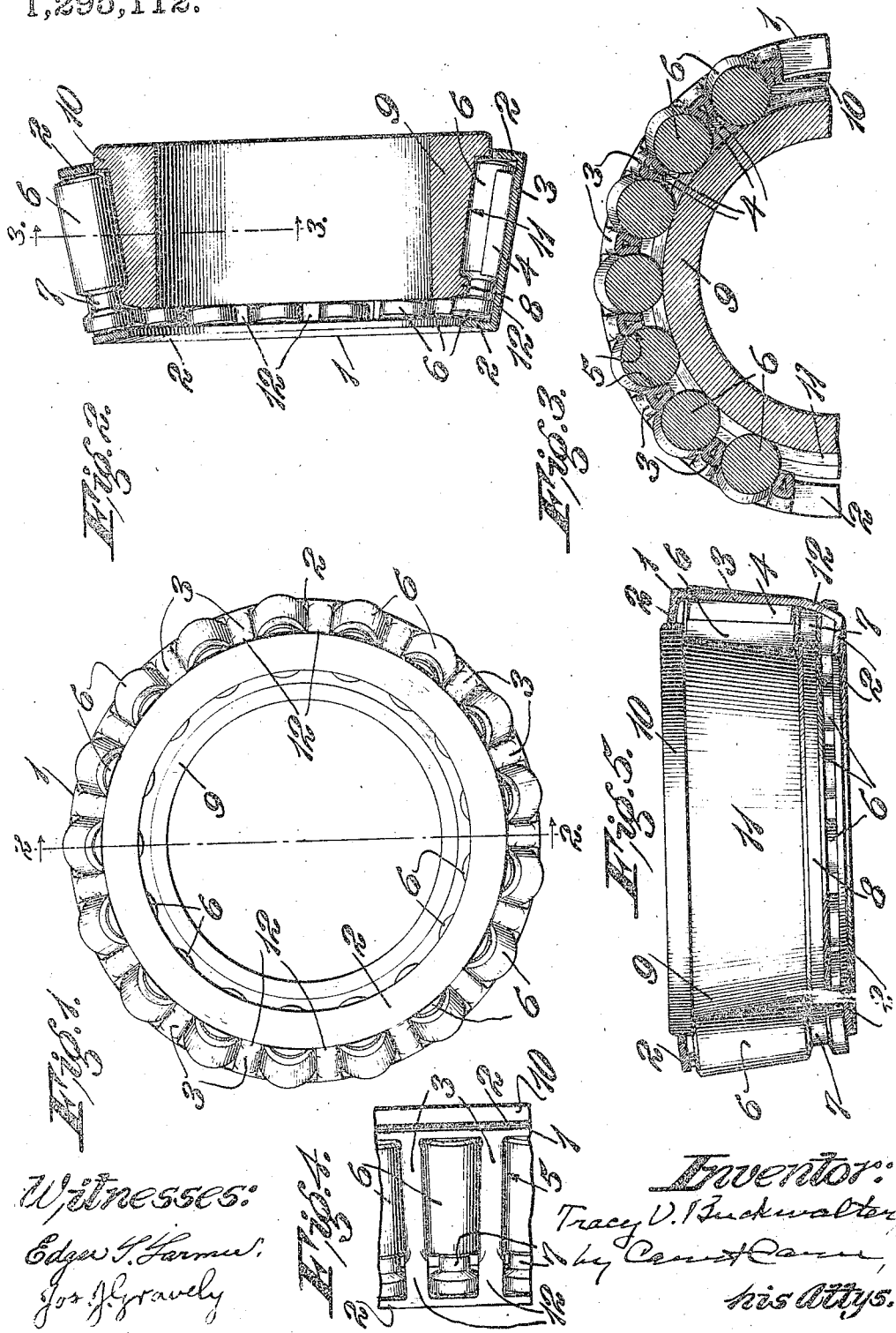

TRACY V. BUCKWALTER, OF CANTON, OHIO, ASSIGNOR TO THE TIMKEN ROLLER BEARING COMPANY, OF CANTON, OHIO, A CORPORATION OF OHIO.

ROLLER-BEARING CAGE.

1,295,112.     Specification of Letters Patent.     Patented Feb. 25, 1919.

Application filed August 20, 1917. Serial No. 187,052.

*To all whom it may concern:*

Be it known that I, TRACY V. BUCKWALTER, a citizen of the United States, and a resident of the city of Canton, county of Stark, and State of Ohio, have invented a new and useful Improvement in Roller-Bearing Cages, of which the following is a specification.

My invention relates to roller bearings, and has for its principal objects to provide a cage of simple and economical construction and of great rigidity; which will contain a relatively large number of rollers, and which is so constructed as to make lubrication of the bearing easy.

The invention consists in the construction, arrangement and combinations of parts hereinafter described and claimed.

In the accompanying drawing, which forms a part of this specification, and wherein like symbols refer to like parts wherever they occur, Figure 1 is an end view of a bearing embodying my invention;

Fig. 2 is a longitudinal section on the line 2—2 of Fig. 1;

Fig. 3 is a cross-section on the line 3—3 of Fig. 2;

Fig. 4 is a fragmentary side view of the cage, showing a roller in position in a pocket; and Fig. 5 is a view similar to Fig. 2, showing the bridges of the cage deflected to permit the parts to be assembled.

A conical cage 1 comprises annular end flanges 2 connected at their outer circumferences by bridges 3. The bridges 3 have inwardly turned wings 4 extending the greater part of their length. These wings 4 form pockets 5 to receive the rollers 6, and their surfaces are concave to conform to the rollers.

The tapered rollers 6 have narrow necks 7 adapted to coöperate with a rib 8 on the smaller end of the inner bearing member 9. The other rib 10 of the inner bearing member 9 is flush with the larger annular flange 2 of the cage. The portion 11 between these two ribs forms the bearing surface for the rollers 6.

The wings 4 extend substantially the length of the bearing surface of the rollers 6. The cage 1 is made of a single piece of pressed steel. The bearing is assembled by deflecting the flat portions 12 of the bridges 3 outwardly sufficiently to permit the assembled cage and rollers to be forced over the rib 8 at the smaller end of the inner bearing member 9. The bridges 3 and wings 4 are then pressed back into proper working position.

The cage permits the use of a larger number of rollers than is possible in the ordinary cage because the bridges are placed at the outer circumference of the flanges and not at the approximate pitch line of the rollers. Placing the bridges at the outer circumference of the cage, where there is more space between the rollers, makes possible the use of wider bridges and results in a more rigid structure. The location of the bridges also increases the carrying capacity of the bearing by making possible the use of a larger number of rollers.

Having the wings cover only the bearing surface of the rollers instead of extending the entire length of the bridges, lengthens the life of the punches and dies used in making the cage, and therefore reduces the cost of production.

Oil coming in contact with the smaller annular flange is not thrown off by centrifugal force, but has a tendency to creep along the bridges, where it will come in contact with the rollers. The width of the bridges and their location at the outer edge of the cage assist materially in the lubrication of the bearing.

The cage as shown in the drawing is used with tapered rollers, but it may be used with cylindrical rollers. Other modifications may be made without departing from the invention.

I claim the following as my invention:

1. A cage for roller bearings consisting of flat annular end flanges disposed crosswise with relation to the axis of the cage and connected at their outer circumferences by bridges, said bridges having wings terminating short of said end flanges and forming pockets for the rollers, the end portions of said bridges being adapted to be bent outwardly to permit assembly of the bearing.

2. A one-piece cage of pressed steel comprising annular end flanges disposed crosswise with relation to the axis of the cage and connected at their outer circumferences by bridges, said bridges having the portion adjacent to one end flange flat and having inwardly extending wings terminating short of said end flanges and forming pockets for the rollers.

3. A conical cage of pressed steel comprising annular end flanges disposed crosswise with relation to the axis of the cage and connected at their outer circumferences by bridges, said bridges having inwardly extending wings terminating short of the end flanges and forming pockets for the rollers.

4. A conical cage for roller bearings comprising annular end flanges disposed crosswise with relation to the axis of the cage and connected by bridges, said bridges having inwardly extending wings terminating short of the end flanges, and having one end portion adapted to be deflected to permit assembling of the rollers.

5. A roller bearing comprising an inner bearing member having an annular rib thereon, rollers having grooves to coöperate with said rib, a cage comprising flat annular end flanges disposed crosswise with relation to the axis of the cage and connected by bridges and wings on said bridges arranged to form pockets for the rollers, said bridges having flat portions at their ends adapted to permit sufficient deflection of said bridges to permit the parts to be assembled.

6. A roller bearing comprising an inner bearing member having an annular rib thereon, rollers having grooves to coöperate with said rib, a cage comprising flat annular end flanges disposed crosswise with relation to the axis of the cage and connected by bridges, said bridges having inwardly extending wings forming pockets for the rollers, said wings terminating short of said end flanges whereby said bridges have end portions adapted to permit deflection of the bridges.

Signed at Canton this 14th day of August, 1917.

TRACY V. BUCKWALTER.